United States Patent
Amrany et al.

(10) Patent No.: US 7,436,849 B1
(45) Date of Patent: Oct. 14, 2008

(54) SYSTEM AND METHOD FOR PARTITIONING A DSLAM NETWORK

(75) Inventors: Daniel Amrany, Ocean Township, NJ (US); William E. Keasler, Tinton Falls, NJ (US)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 1055 days.

(21) Appl. No.: 10/211,820

(22) Filed: Aug. 2, 2002

Related U.S. Application Data (60) Provisional application No. 60/309,993, filed on Aug. 3, 2001.

(51) Int. Cl.
H04J 3/16 (2006.01)
H04L 12/66 (2006.01)

(52) U.S. Cl. .................. 370/465; 370/352; 370/493; 370/498; 370/535

(58) Field of Classification Search ......... 370/230–238, 370/389, 392, 401, 397, 352–354, 277, 293, 370/410, 535, 442, 465, 470, 498
See application file for complete search history.

(56) References Cited

U.S. PATENT DOCUMENTS

| | | | | |
|---|---|---|---|---|
| 4,922,484 A * | 5/1990 | Yoshida et al. .............. 370/421 |
| 6,075,784 A * | 6/2000 | Frankel et al. .............. 370/356 |
| 6,181,715 B1 * | 1/2001 | Phillips et al. .............. 370/493 |
| 6,363,079 B1 * | 3/2002 | Barzegar et al. ............ 370/465 |
| 6,407,997 B1 * | 6/2002 | DeNap et al. ............... 370/352 |
| 6,424,657 B1 * | 7/2002 | Voit et al. .................... 370/412 |
| 6,438,144 B1 * | 8/2002 | Guzikevits et al. .......... 370/535 |
| 6,643,253 B1 * | 11/2003 | Smith .......................... 370/217 |
| 6,775,271 B1 * | 8/2004 | Johnson et al. ............. 370/352 |
| 6,781,981 B1 * | 8/2004 | Kimbrough ................. 370/352 |
| 6,798,784 B2 * | 9/2004 | Dove et al. .................. 370/463 |
| 6,829,246 B2 * | 12/2004 | Silberman et al. ........... 370/463 |
| 6,928,068 B1 * | 8/2005 | Crowe et al. ................ 370/352 |
| 6,937,595 B2 * | 8/2005 | Barzegar et al. ............ 370/352 |
| 6,990,110 B2 * | 1/2006 | Nattkemper et al. ........ 370/397 |

* cited by examiner

*Primary Examiner*—Afsar M. Qureshi
(74) *Attorney, Agent, or Firm*—Thomas, Kayden, Horstemeyer & Risley, LLP (57) ABSTRACT

System and method for partitioning a DSLAM network. In this regard, one such network can be broadly summarized by a representative communication system comprising a digital subscriber line access multiplexer (DSLAM) that is communicatively coupled on its line-side to a high-speed digital link. The DSLAM is communicatively coupled through the high-speed digital link with the trunk side of a remote line access unit (RLAU). The RLAU is communicatively coupled on its line-side to a first digital subscriber line (DSL).

22 Claims, 10 Drawing Sheets

SYSTEM AND METHOD FOR PARTITIONING A DSLAM NETWORK

CROSS-REFERENCE TO RELATED APPLICATIONS

This application claims the benefit of U.S. Provisional Patent Application Ser. No. 60/309,993 filed on Aug. 3, 2001, and entitled "DSL Extender" which is hereby incorporated by reference in its entirety.

FIELD OF THE INVENTION

The present invention generally relates to digital subscriber line (DSL) systems. More specifically, the invention relates to a system and method for partitioning a digital subscriber line access multiplexer (DSLAM) system.

DESCRIPTION OF THE RELATED ART

First generation digital subscriber line access multiplexers (DSLAMs) were typically located within the wire centers, also known as central offices (CO), to provide digital subscriber line (DSL) services to multiple customers located within a customer serving area (CSA) centered around the CO. The CO environment provided advantages related to DSLAM installation, service, and maintenance. As DSL architectures evolved, DSLAMs were installed in alternative locations such as remotely-located digital loop carrier (DLC) cabinets, so as to extend DSL coverage to subscribers served by DLC systems. The DSLAMs installed in these alternative remote locations have been generally connected to a CO through a high-speed digital link, such as a synchronous optical network (SONET) optical link.

While there are several advantages in placing DSLAMs at remote locations so as to provide larger DSL coverage, merely moving a DSLAM that has been designed for CO use to a remote location may not provide an optimum solution. Some of the issues related to such remotely-located DSLAMs include poor serviceability, space constraints, environmental constraints, and powering constraints. An improved architecture that provides a different partitioning of a DSLAM network is desirable to reduce the impact of such issues.

Figure 1:
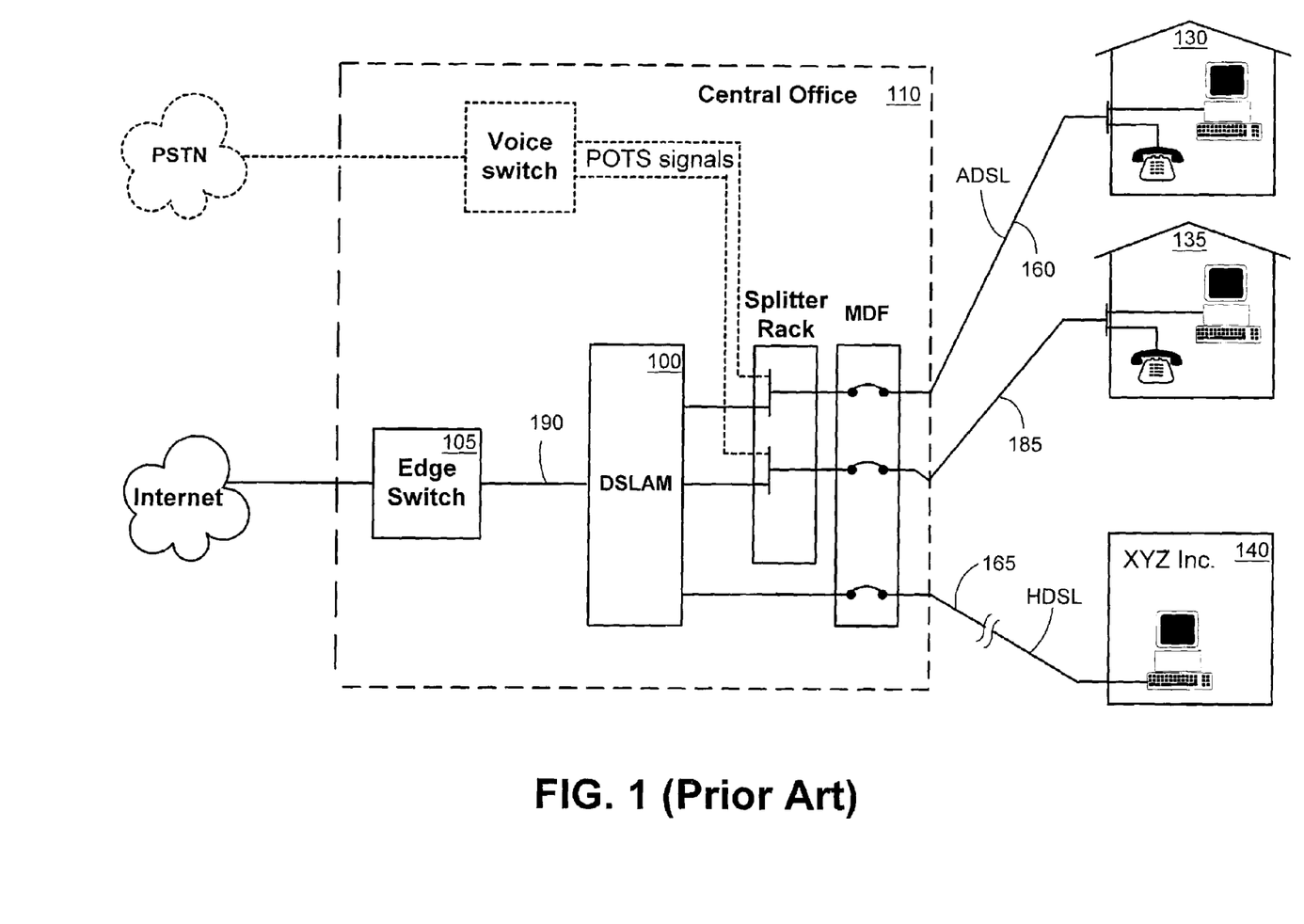
FIG. 1 is an illustration of a typical central office providing DSL service to multiple customers located within a customer serving area.

FIG. 1 illustrates a typical CO providing DSL service to multiple customers. The DSLAM 100, shown located inside the CO 110, is a principal component of a communication system that is designed to provide DSL service to multiple customers from a centralized location.

ADSL is a popular service provided for residential customers due to the asymmetric nature of data usage by such customers. Business users may prefer a more symmetric data flow, and Symmetric DSL (SDSL) provides one solution to this requirement. To service both asymmetric as well as symmetric users, a DSLAM typically incorporates a limited number of ADSL line cards together with additional line cards corresponding to other DSL standards. The various DSL standards are generally referred to collectively as a group, by the term xDSL, where the letter "x" may be suitably replaced by an appropriate letter to define one particular type of DSL. The xDSL group includes DSL technologies such as SDSL, ISDN digital subscriber line (IDSL), very-high speed DSL (VDSL) and high-speed DSL (HDSL).

FIG. 1 illustrates DSLAM 100 providing ADSL service to residences 130 and 135 using local loops 160 and 185. Residences 130 and 135 are located within the CSA of CO 110. HDSL service is provided to a business customer, XYZ Inc., located in a business location 140. DSLAM 100 provides this HDSL service using a HDSL link 165, which is typically longer than a telephone local loop. HDSL is a symmetric baseband transmission system with the upstream and downstream data rates being identical. While earlier versions of HDSL utilized two or more pairs of wires, recent developments in HDSL technology permit simultaneous upstream and downstream transmission over a single pair of wires.

On the trunk side of DSLAM 100, a high-speed data link 190 is shown connecting the DSLAM 100 to the edge switch 105, which is connected to the Internet. Data link 190 may, for example, carry data packets contained inside an ATM transport mechanism.

Figure 2:
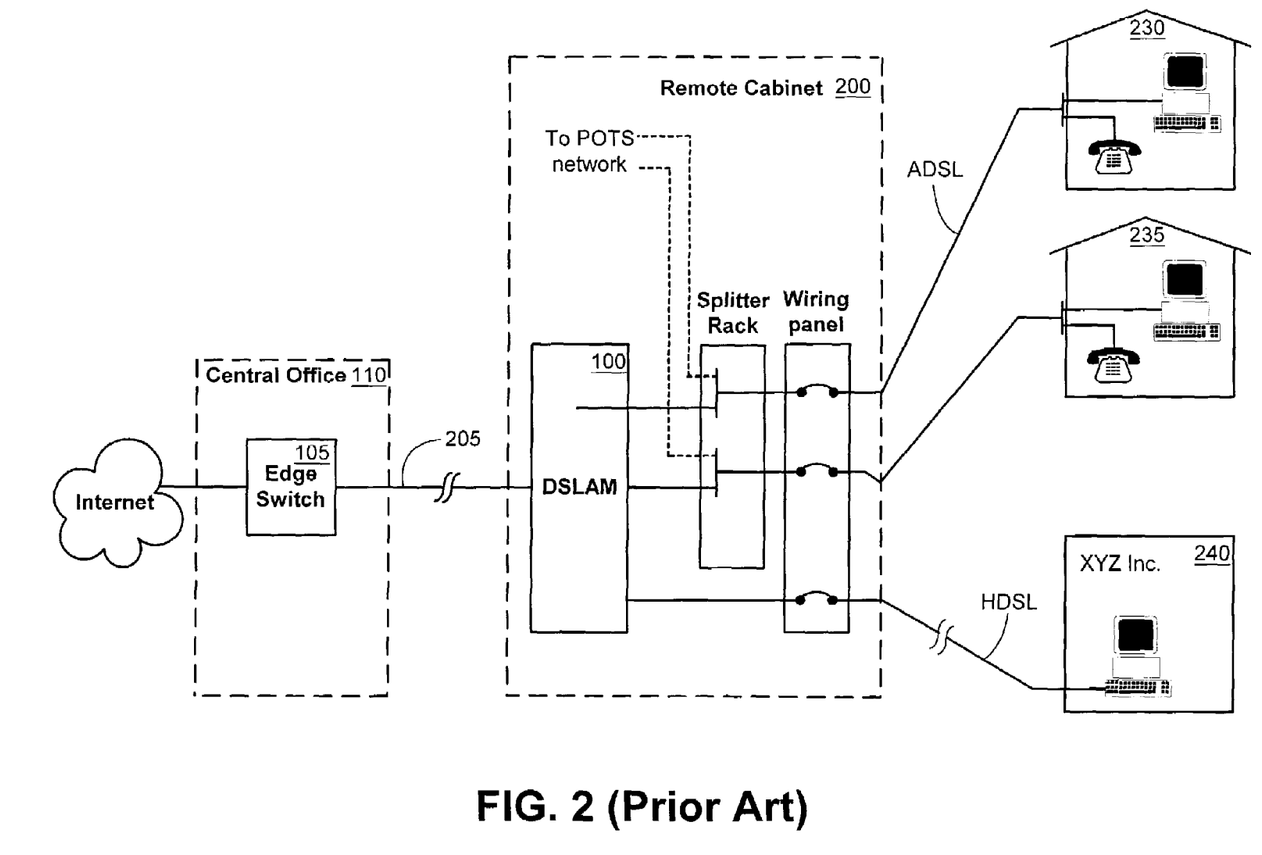
FIG. 2 is an illustration of a DSLAM located in a remote cabinet providing DSL service to multiple customers located within an extended customer serving area.

FIG. 2 illustrates the DSLAM 100 located in a remote cabinet 200 that is connected to CO 110 via a high-speed digital link 205. Residences 230 and 235 that are being provided ADSL service by DSLAM 100 are located in the extended CSA of CO 110. Business location 240 is also shown in this extended CSA, and is provided HDSL service by DSLAM 100.

Figure 3:
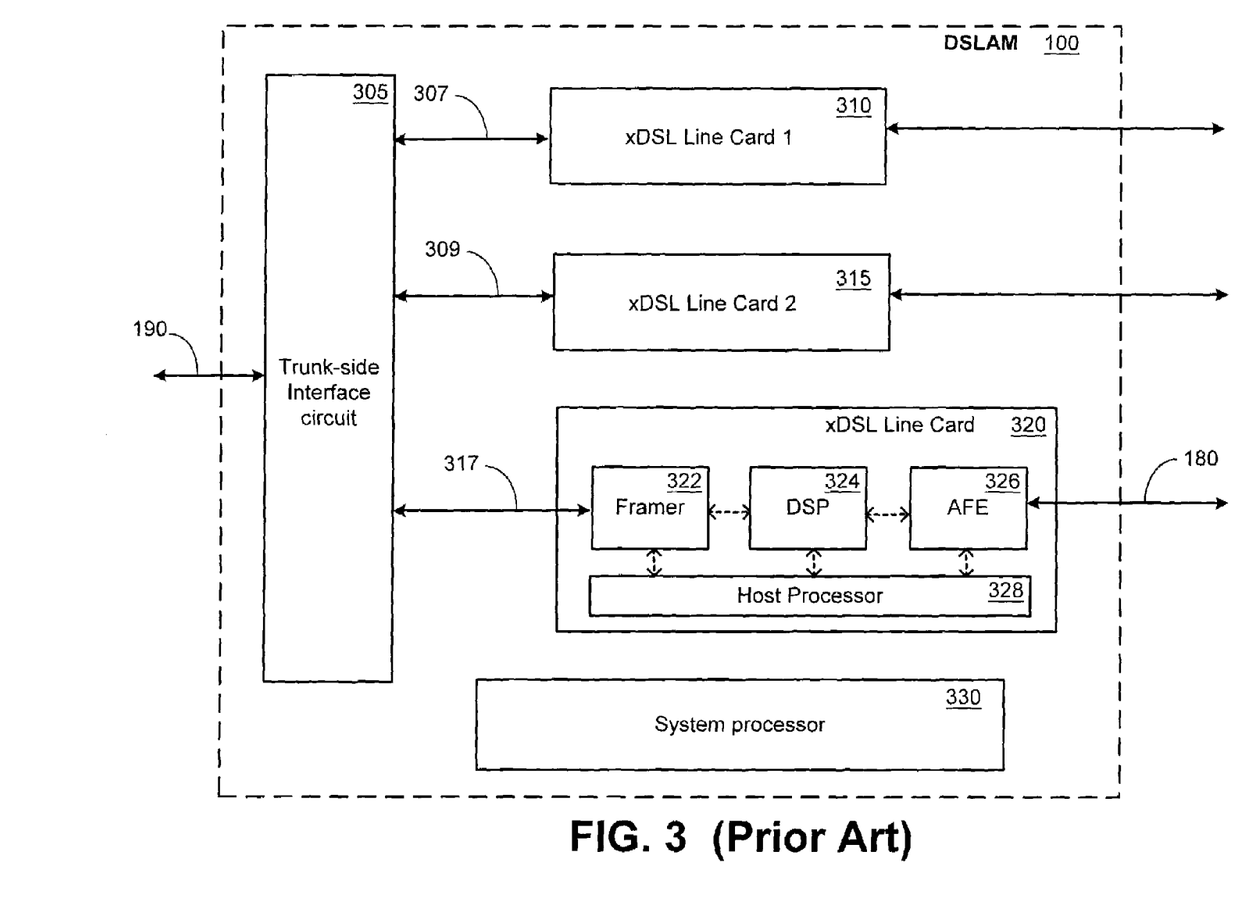
FIG. 3 is a block diagram representation of the main functional blocks inside a typical DSLAM.

FIG. 3 is a block diagram representation of the main functional blocks inside a typical DSLAM such as DSLAM 100. The various blocks shown in FIG. 3 generally represent circuit packs that are plugged into a DSLAM chassis. The circuit pack architecture permits easy insertion and/or removal, thereby permitting a certain degree of flexibility in configuring the DSLAM 100 to provide various types of DSL service. It also allows relatively easy replacement of defective circuit packs, a replacement that may be carried out while the DSLAM is in operation without simultaneously affecting all of the multiple customers that are being provided DSL service.

The high-speed data link 190 of the trunk-side interface circuit 305, connects DSLAM 100 to an edge switch located in the CO. Data link 190 may carry data packets over various transport protocols, such as ATM and TCP/IP. On the line-card side of the trunk-side interface circuit 305, data links such as links 307, 309, and 317 connect the interface circuit 305 to multiple line cards.

Three xDSL line cards 310, 315, and 320 are shown in FIG. 3. While xDSL line cards 310 and 315 may be designed to provide ADSL service to two independent residential customers, xDSL line card 320 may be designed to provide HDSL service to a business customer.

A typical circuit inside an xDSL line card, is shown inside xDSL line card 320. Framer 322, digital signal processor (DSP) 324, and analog front end (AFE) 326 elements are used to convert a binary digital signal being carried on link 317 from the trunk-side interface circuit 305, into a downstream signal that is suitably formatted for transmission into link 180. For providing ADSL service, this conversion scheme may incorporate a discrete multi-tone (DMT) encoding system, while for HDSL service a 2B1Q format may be used.

Framer 322, digital signal processor (DSP) 324, and analog front end (AFE) 326 are also used to implement a complementary upstream conversion scheme for DSL data received via link 180.

Host processor 328 is used to control the various elements such as framer 322 and DSP 324, located in the xDSL line card 320. This control is generally implemented by firmware and/or software that is stored in memory devices (not shown) that are associated with host processor 328.

While one form of software upgrade may be carried out through remote downloads using suitable circuitry, firmware upgrades generally necessitate physical access to the xDSL line card 320. Such firmware upgrades are typically carried out by service personnel who travel to the remote location and unplug the xDSL line card 320 to upgrade the appropriate hardware.

System processor 330 is used for operations, administration, maintenance and provisioning (OAM&P) of the various circuit packs inside the DSLAM 100. For example, provisioning the DSLAM 100 may include such procedures as would be necessary to provide various types of DSL service via different types of xDSL line cards. Maintenance may include inventory procedures as well as failure reporting. System processor 330 interacts with various processors, such as the host processor 328, inside DSLAM 100 using system-level software and/or firmware. This system-level software may be remotely upgraded through a suitable communication medium (not shown) that links DSLAM 100 to the CO 110. Firmware upgrades typically require physical access by service personnel.

Service visits, whether for repair, maintenance, or upgrade purposes, constitute a significant monetary expense that telephone companies strive to minimize. It is therefore desirable that circuitry incorporated into remotely-located equipment, such as DSLAM 100 of FIG. 3, should be designed robustly to minimize expensive service visits, and to maximize mean-time-between-failures (MTBF).

Maximizing MTBF encompasses various actions such as reducing hardware circuitry, reducing circuit complexity, reducing packaging size, and reducing heat dissipation.

SUMMARY OF THE INVENTION

The present invention provides a system and method for partitioning a DSLAM network. In this regard, one such system can be broadly summarized by a representative communication system comprising a digital subscriber line access multiplexer (DSLAM) that is communicatively coupled on its line-side to a high-speed digital link; and a first remote line access unit (RLAU) that is communicatively coupled on its trunk-side to the DSLAM through the high-speed digital link, and is communicatively coupled on its line-side to a first digital subscriber line (DSL).

Another embodiment can be described as a digital communication system that includes a first circuit comprising a portion of a digital subscriber line access multiplexer (DSLAM) line card, the first circuit located at a first location; and a second circuit comprising a remainder portion of the DSLAM line card, the second circuit located at a second location.

DESCRIPTION OF THE DRAWINGS

Many aspects of the invention can be better understood with reference to the following drawings. The components in the drawings are not necessarily drawn to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DSL network coverage over an extended CSA is traditionally provided by installing a DSLAM in a remote cabinet. The DSLAM typically communicates with an edge switch located in a CO via a high-speed digital trunk such as a SONET fiber-optic trunk.

Figure 4A:
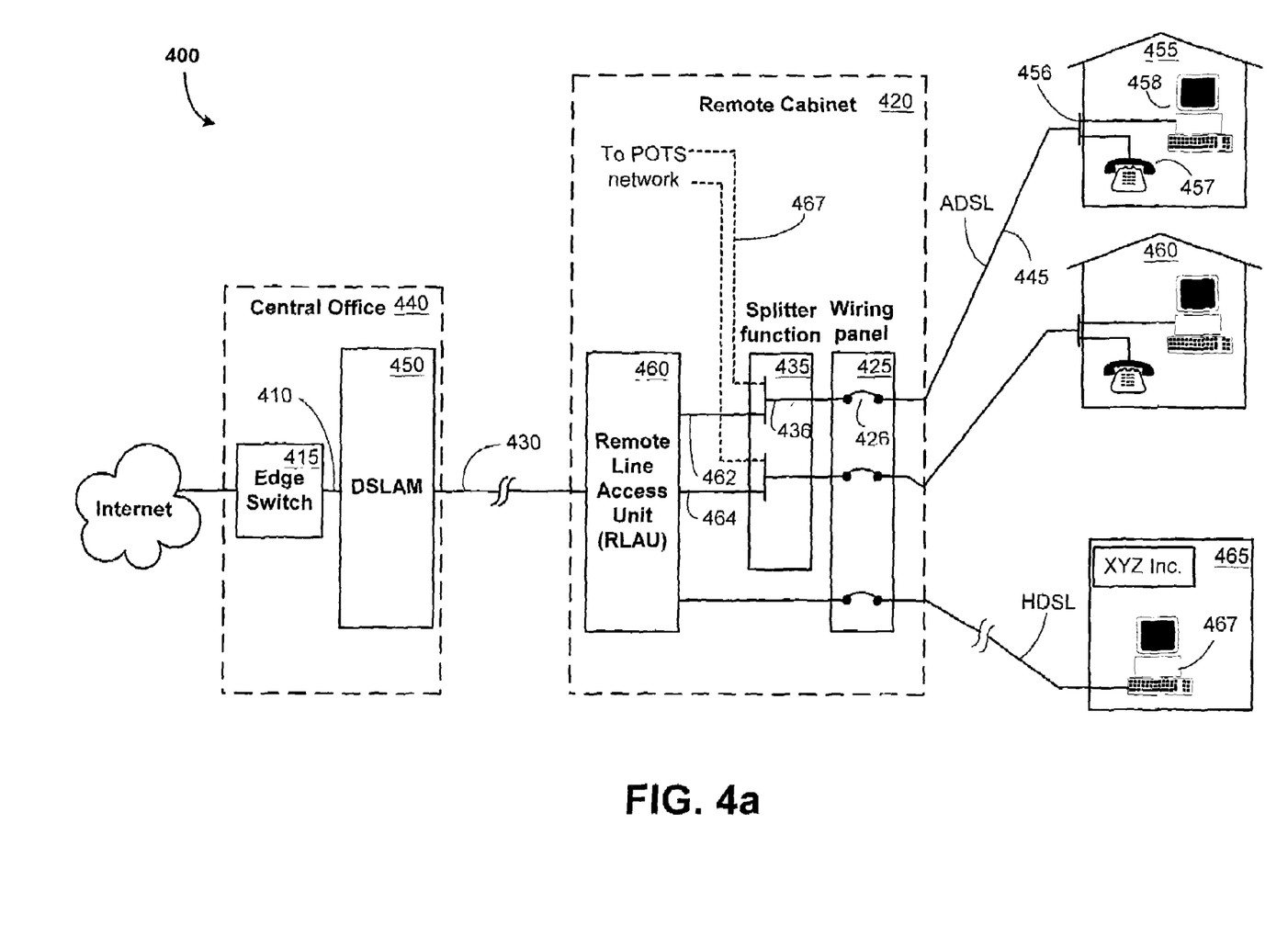
FIG. 4a illustrates a communication system that provides partitioning of a DSLAM network by using a remote line access unit of the invention.

FIG. 4a illustrates a communication system 400 that provides DSL service over an extended CSA, by utilizing a DSLAM 450 that incorporates the present invention and is located in central office 440, together with a remote line access unit (RLAU) of the present invention located in a remote cabinet 420.

On its trunk side, DSLAM 450 communicates with an edge switch 415 using high-speed digital trunk 410. On its line side, DSLAM 450 communicates with RLAU 460 through a high-speed digital link 430 that has a large bandwidth. DSLAM 450 incorporates suitable hardware to interface into this high-speed digital link 430. An example of a communication link that may be used for implementing high-speed digital link 430, is a fiber-optic link capable of supporting wavelength-division-multiplexing (WDM) and utilizing technologies such as SONET and Gigabit Ethernet. The use of such communication links in ring configurations and in long-distance inter-city communication systems, is known to persons of ordinary skill in the art. The bandwidth of such communication links has been under-utilized due to lack of customer demand in certain cases and due to over-providing in certain other cases. The high-speed digital link 430 may be used to exploit such unused bandwidth.

RLAU 460 provides a simplified and robust architecture to deliver DSL services from remote cabinet 420. Communication links 462 and 464 are two examples of communication links that provide ADSL service from the RLAU 460 to residential customers residing in residences 455 and 460. Links 462 and 464 connect the RLAU 460 to the splitter function 435. It may be relevant to point out, that while FIG. 4a depicts the splitter function 435 as existing external to RLAU 460, several system configurations may physically incorporate the splitter functionality inside the RLAU 460. The links 462 and 464 individually transport downstream as well as upstream ADSL data.

Splitter 436 used here for explanation purposes in a full-rate ADSL application, combines the downstream ADSL signal that is transmitted by the RLAU 460 over link 462, with the analog voice frequency (VF) signal carried from the plain-old-telephone-system (POTS) network over link 467. The combined downstream signal is then transmitted to the wiring panel 425 via link 436.

Wires entering and exiting the remote cabinet 420 are interconnected using jumpers, such as jumper 426, in the wiring panel 425. The downstream ADSL signal together with the downstream analog VF signal that is present at jumper 426 is connected by the twisted wire pair 445 to the residence 455. Splitter 456 is located on the outside wall of residence 455, and splits the signal transmitted via twisted wire pair 445, into an analog VF signal and a downstream ADSL data signal. The analog VF signal may be routed to a telephone 457, while the downstream ADSL data signal is connected to a PC 458. The downstream ADSL signal entering PC 458 is generally routed to an ADSL modem that may be installed inside the PC 458 or may be installed as an external modem that is connected by a cable to the PC 458.

An upstream ADSL data signal generated by PC 458, together with the upstream analog VF signal from telephone 457 is transmitted from the residence 455 towards the remote cabinet 420 over the same external twisted wire pair 445.

FIG. 4a also illustrates a HDSL connection that connects RLAU 460 to business location 465. The PC that is shown inside business location 465 illustrates a customer premise equipment (CPE) 467. CPE 467 typically incorporates a modem, which in this case is a HDSL modem. The modem may be an independent device serving one individual user or may be a modem that is incorporated into a server that is a part of a local area network (LAN) inside business location 465.

Figure 4B:
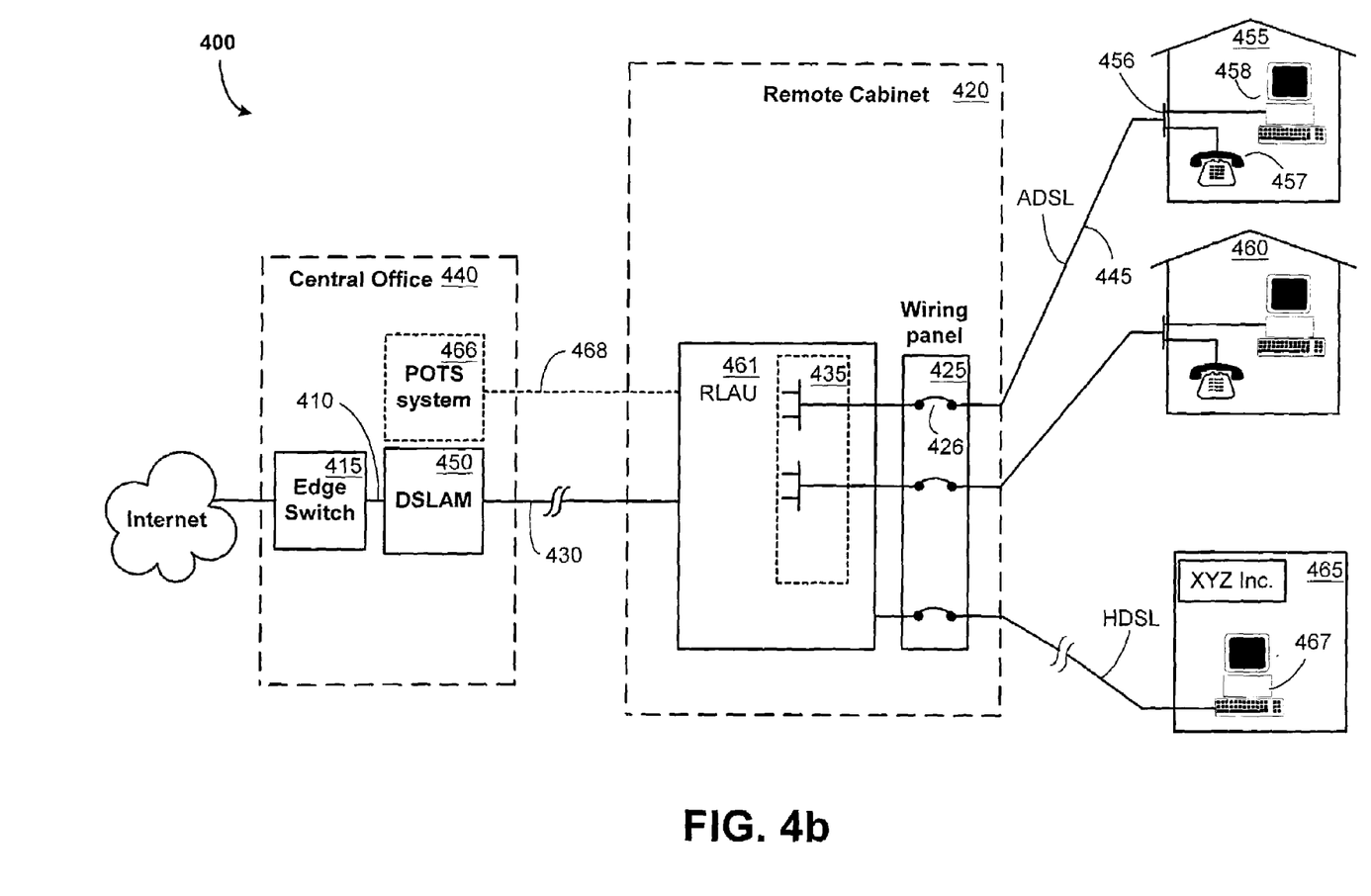
FIG. 4b illustrates a remote line access unit of the invention with splitter functionality integrated inside it.

FIG. 4b illustrates an RLAU 461 with the splitter function 435 incorporated inside. In addition to the high-speed digital link 430, RLAU 461 is provided with a voice link 468, shown by the dotted line connection from POTS system 466. POTS system 466 is pictorial representation of various voice processing elements, such as a CO switch. While FIG. 4b illustrates POTS system 466 inside a CO, it will be recognized by persons of ordinary skill in the art, that it may be replaced by other voice processing elements, such as a DLC, a private branch exchange voice switch located outside a CO, or a voice gateway. It will also be recognized that voice link 466 may be implemented in a variety of ways using a variety of signaling formats. Accordingly the voice processing elements may also be selected to accommodate such formats. For example, a GR-303/V5.2 voice gateway may be used to implement one of several standards that are known to people of ordinary skill in the art.

Voice link 468 may be physically implemented as a communication link that is distinct from high-speed digital link 430, or it may be integrated into the high-speed digital link 430. Voice link 468 carries POTS-related voice information in the form of analog base-band signals, and/or as signals in other transmission formats. Transmission formats encompass a variety of technologies such as derived-voice transmission, carrier-based transmission, and base-band digital data transmission.

Figure 5:
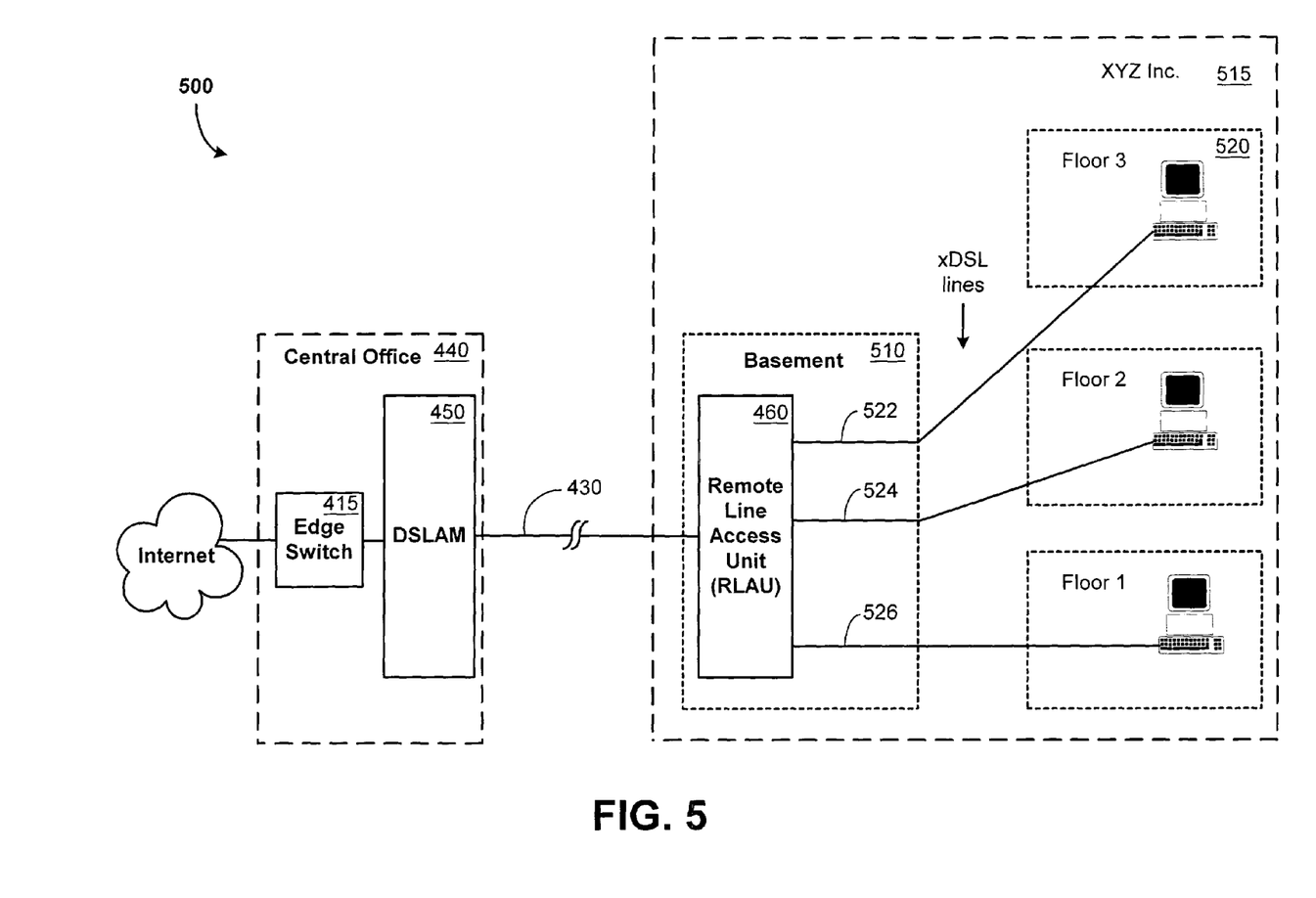
FIG. 5 illustrates a communication system incorporating a DSLAM in a CO, together with a remote line access unit (RLAU) of the invention located inside a business location.

FIG. 5 illustrates a communication system 500 incorporating a DSLAM 450 in a CO 440, together with a RLAU 460 located in a basement 510 of a customer premise 515. Customer premise 515 of FIG. 5, represents several types of structures, encompassing residential as well as business customers. Such structures which include for example, dormitories, apartment buildings, condominium complexes, hotels, and public housing units, are sometimes referred to as multi-tenant units (MTU) or as multi-dwelling units (MDU).

While DSLAM 450 is shown located inside basement 510, it will be apparent to persons of ordinary skill in the art, that the DSLAM 450 may be installed in other facilities such as utility poles, curb-side cabinets, or office closets. When installed in basement 510, the links 522, 524 and 526 that are shown together with DSLAM 460 may be installed as part of an existing inter-building wiring network. This wiring network may utilize, for example, CAT-5 cabling, fiber-optic cabling, or twisted pair wires to interconnect various offices and various floors. The inter-building wiring network may also incorporate other devices such as multiplexers and de-multiplexers, and encompass various LAN architectures such as star, daisy-chain, or bus structures. The PCs shown in FIG. 5, constitute the CPEs that are served by RLAU 460. The type of DSL service provided in this application may for example, be SDSL rather than ADSL, and may encompass various transport technologies such as Ethernet and ATM. RLAU 460 can be provisioned with the appropriate line cards to cater to the particular type of DSL service used.

Figure 6:
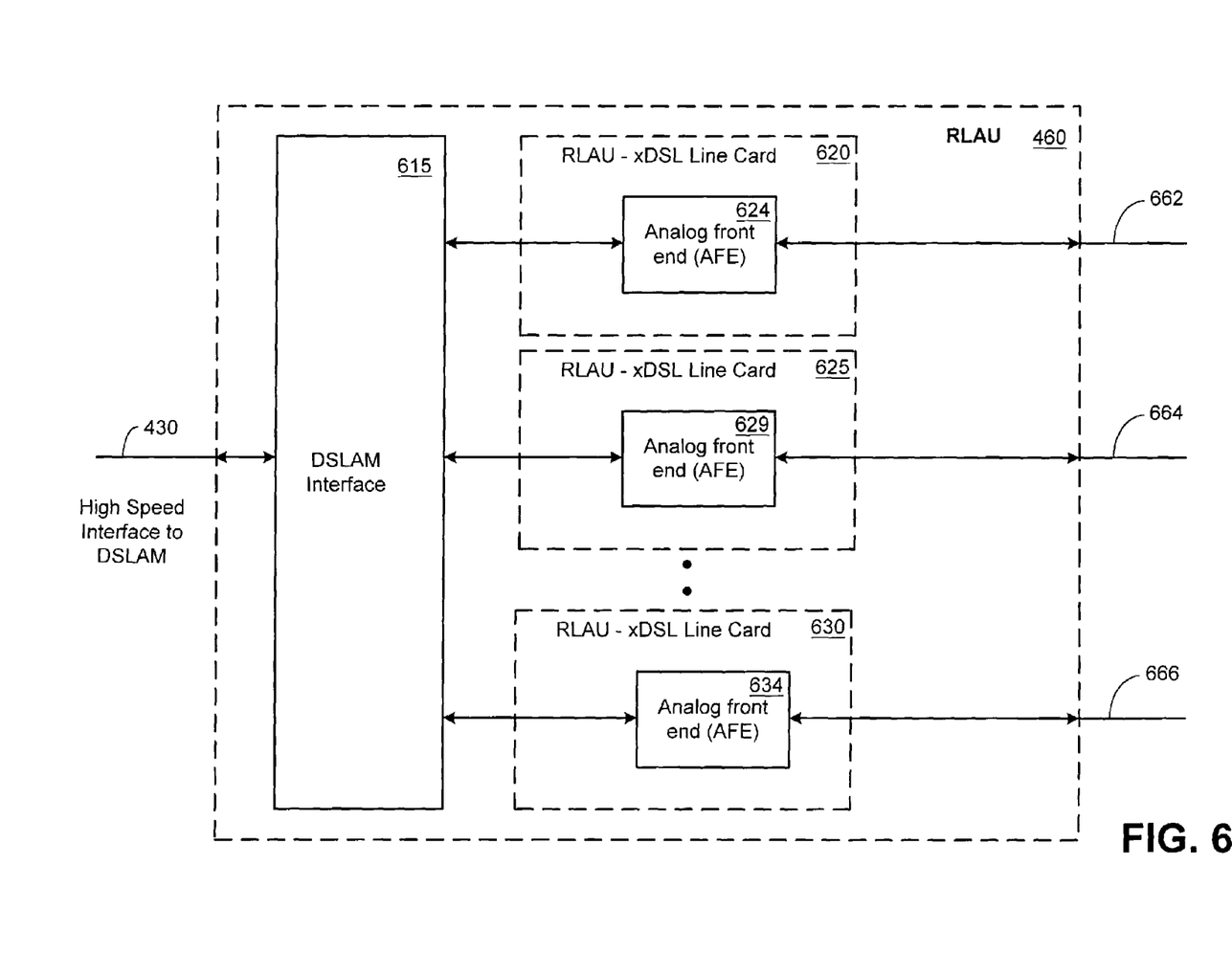
FIG. 6 is a block diagram representation of the main functional blocks inside an exemplar remote line access unit.

FIG. 6 is a block diagram representation of the main functional blocks inside an exemplar RLAU. RLAU 460 includes several RLAU-xDSL line (620, 625, 630), which are suitably configured to provide DSL service via links 662, 664, and 666. Links 662, 664, and 666 are selected to accommodate transport of the appropriately-selected DSL technologies. For example, if ADSL service is to be provided over link 662, this link 662 is selected to be a POTS twisted wire pair. On the other hand, if HDSL service is to be provided over link 662, twisted wire pair suitable for long-distance signal transport similar to that used for T-1 transport, may be selected instead.

Using RLAU-xDSL line card 620 as an example, the AFE functionality, as well as functionality of other circuitry that may be typically incorporated into an xDSL line card of RLAU 460, is explained.

AFE 624 on RLAU-xDSL line card 620 provides an xDSL interface for RLAU 460 into link 662. One of the functions incorporated into AFE 624 is a transceiver circuit, which is associated with line-driver functionality in certain applications. Other circuit elements contained in AFE 624 may include 2 wire-to-4 wire hybrid converters, and impedance matching circuitry.

AFE 624 is designed to accommodate the particular flavor of DSL that is supported on link 662. For example, AFE 624 may be designed to accommodate signal characteristics related to line-length and line-impedance matching that are necessary to transmit and receive DSL signals over link 662. AFE 624 may also include digital-to-analog (D/A) conversion as well as analog-to-digital (A/D) conversion that may be needed to convert the line signals carried on link 662, into binary digital signals that can be interfaced into the DLSAM interface block 615 associated with RLAU-xDSL line card 620.

In the upstream direction (from RLAU 460 towards CO), the DSLAM interface block 615 accepts digital signals that are transmitted upstream by the one or more RLAU-xDSL line cards (624, 629, 634) inside RLAU 460, aggregates these signals, and converts the aggregated signal into a format that is appropriate for transmitting into the high-speed digital link 430. A complementary process is carried out for downstream signals that are received from the CO over high-speed digital link 430.

RLAU 460 is designed to provide robustness and to minimize cost. Towards this end, the embodiment shown in FIG.

6, eliminates hardware circuitry that uses systems operating software. The costs and service issues related to systems operating software installed within communication systems located inside remote cabinets, is fairly significant, and the minimization and/or elimination of such software is very desirable. Also, the use of relatively simple hardware such as shown in FIG. 6, allows greater packaging density while minimizing heat dissipation from the RLAU 460. Greater packaging density translates to providing DSL service to a larger number of customers from a single unit such as RLAU 460.

Figure 7:
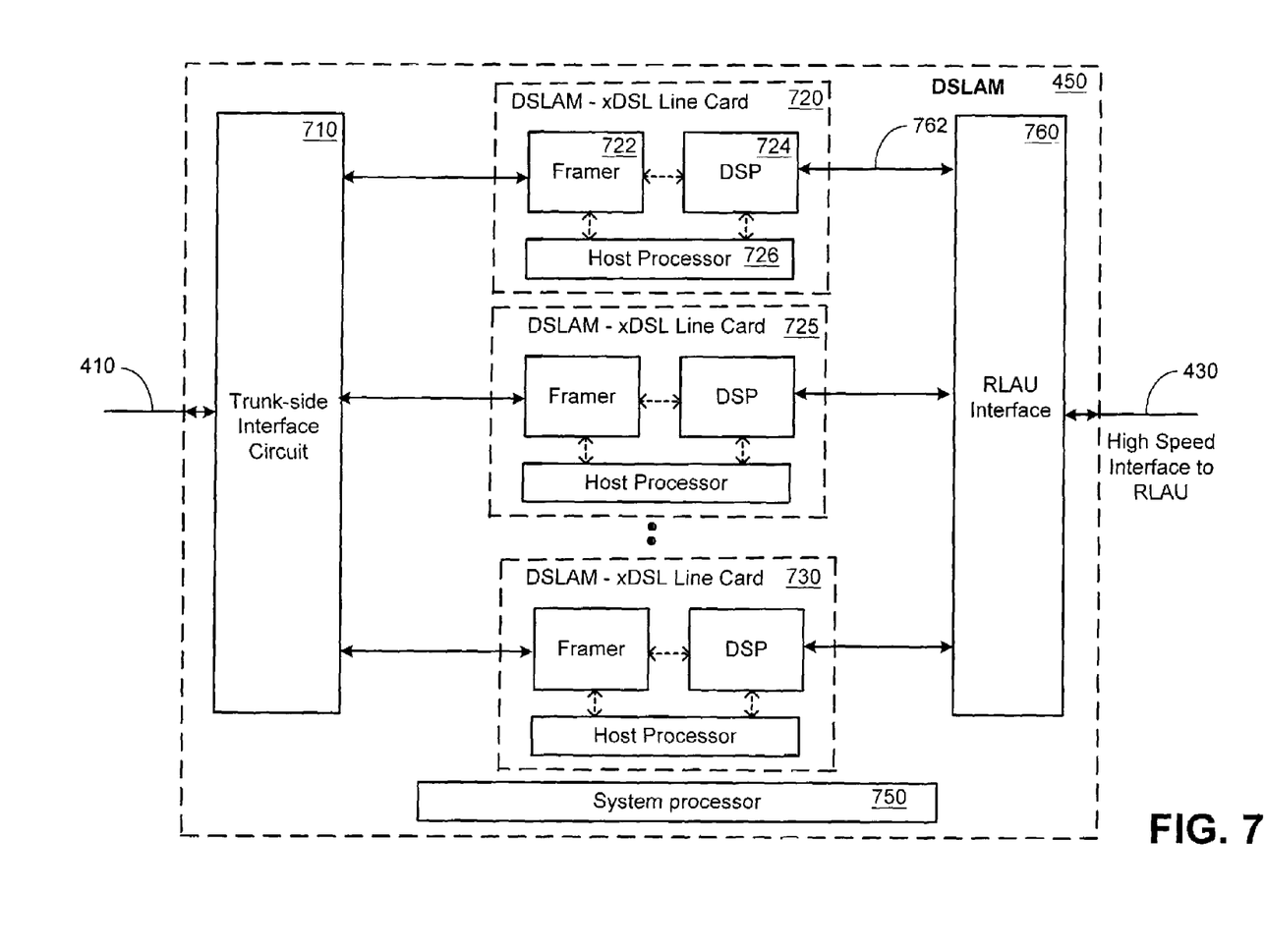
FIG. 7 is a block diagram representation of the main functional blocks inside a DSLAM that incorporates the present invention.

FIG. 7 is a block diagram representation of the main functional blocks inside an exemplar DSLAM that incorporates the present invention. DSLAM 450 includes several DSLAM-xDSL line cards (720, 725, 730) that constitute the CO-end equipment to complement the RLAU-xDSL line cards installed inside an RLAU at a corresponding remote end.

For example, DSLAM-xDSL line card 720 may be an ADSL line card that complements an RLAU-xDSL line card that has been configured to serve an ADSL customer from a remotely-located RLAU. The DSLAM-xDSL line card 720, used here for example purposes, has an RLAU interface block 760 that accepts an upstream digital signal from the high-speed digital link 430 and carries out the complementary function to that executed by the DSLAM interface block 615 inside RLAU 460 (FIG. 6).

A line-formatted digital signal appearing on high-speed digital link 430 is converted by the RLAU interface block 760 into a binary digital signal that is selectively routed to one of the several DSLAM-xDSL line (720, 725, 730). DSLAM-xDSL line card 720 is connected to RLAU interface block 760 via link 762. A binary digital signal, which may be carried over link 762, is connected to a digital signal processor (DSP) 724 in xDSL line card 720. DSP 724 carries out multiple processing functions upon this binary digital signal. These functions typically include filtering and modem operations.

Framer 722 implements a suitable framing format to convert this binary digital signal into a signal format that can be carried over the high-speed digital trunk 410. Trunk-side interface circuit 710 aggregates multiple binary digital signals from one or more DSLAM-xDSL line cards that are installed in DSLAM 450 and transfers this aggregated signal into high-speed digital trunk 410, which typically connects DSLAM 450 to an edge switch located in a CO.

While the functioning of the DSLAM 450 is explained with reference to the upstream signal transmission path, it will be understood that the explanation will be applicable with corresponding equivalency in the downstream signal transmission path as well.

Both framer 722 and DSP 724 may be implemented as programmable devices that may be dynamically configured through the use of software and/or firmware to implement various hardware functions. Framer 722, for example, may be implemented using a field-programmable-gate-array (FPGA), or alternatively, using an application-specific-integrated-circuit (ASIC). It can also be implemented via a programmable processor or engine that may be embedded inside a DSL processing engine.

It will be understood that the functionality of devices such as framer 722, DSP 724, and host processor 726, located on the DSLAM-xDSL line card 720 may be collectively referred to as a digital signal processing circuit. In this context, the term "digital signal processing" is not merely confined to the DSP 724 device.

Software and/or firmware that is typically stored in memory devices (not shown) in the DSLAM-xDSL line card 720, is used by the host processor 726 located in DSLAM-xDSL line card 720, to carry out OAMP functions. These OAMP functions are coordinated through the system processor 750 located in DSLAM 450. System processor 750 may have suitable communication interfaces that enable devices external to DSLAM 450, to interact with DSLAM 450, for providing various functions such as software downloads for DSLAM system upgrade. Use of such communication interfaces is known to persons of ordinary skill in the art.

As DSLAM 450 is located locally inside a CO, OAMP operations may be carried out by service personnel, in a manner that is much easier and convenient in comparison to carrying out such operations upon a DSLAM installed at a remote location.

Figure 8:
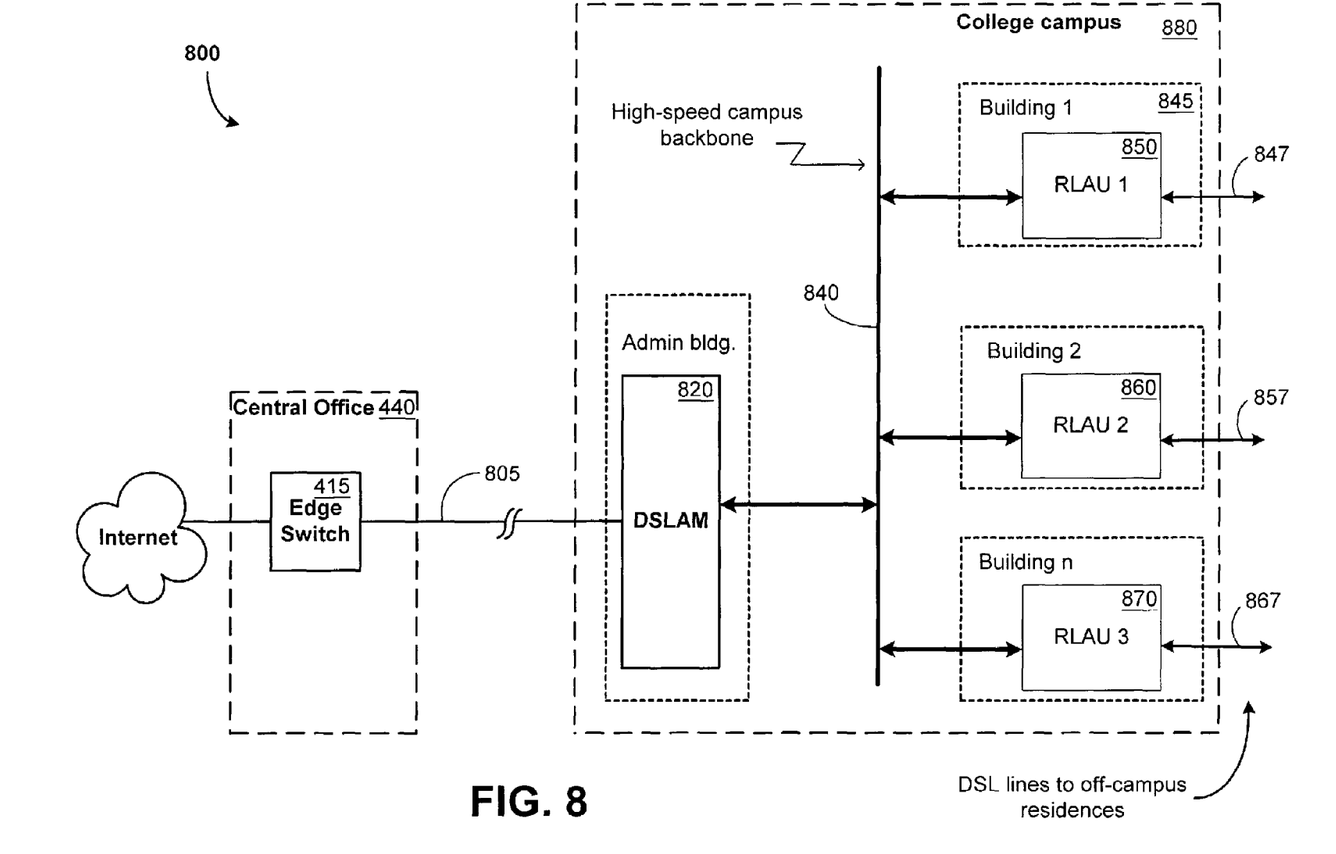
FIG. 8 illustrates a communication system located in a college campus that incorporates a DSLAM and multiple RLAUs.

FIG. 8 illustrates a communication system located in a college campus that incorporates a DSLAM and multiple RLAUs. DSLAM 820 communicates with one or more RLAUs that are connected to a high-speed digital link, such as the campus LAN backbone 840. While DSLAM 820 may communicate with an edge switch 415 at CO 440, through high-speed digital trunk 805 in a industry-standard format, using technologies such as SONET and ATM, the campus LAN backbone 840 will be a large-bandwidth network typically using an Ethernet-oriented structure.

The DSLAM architecture highlighted in communication system 800 of FIG. 8, optimizes the bandwidth usage on campus LAN backbone 840. The RLAUs shown inside various buildings of college campus 880, may be installed as stand-alone communication equipment or may be incorporated into existing equipment that interact with the LAN backbone 840. For example, RLAU 1 850 may be a plug-in card that is installed inside a PC used by a student in building 1 845. This RLAU 1 850 is connected via DSL link 847 to a modem that may be installed inside a PC used by the student in his off-campus residence. Links 857 and 867 are DSL links that connect RLAUs 860 and 870 to modems in other off-campus residences.

Figure 9:
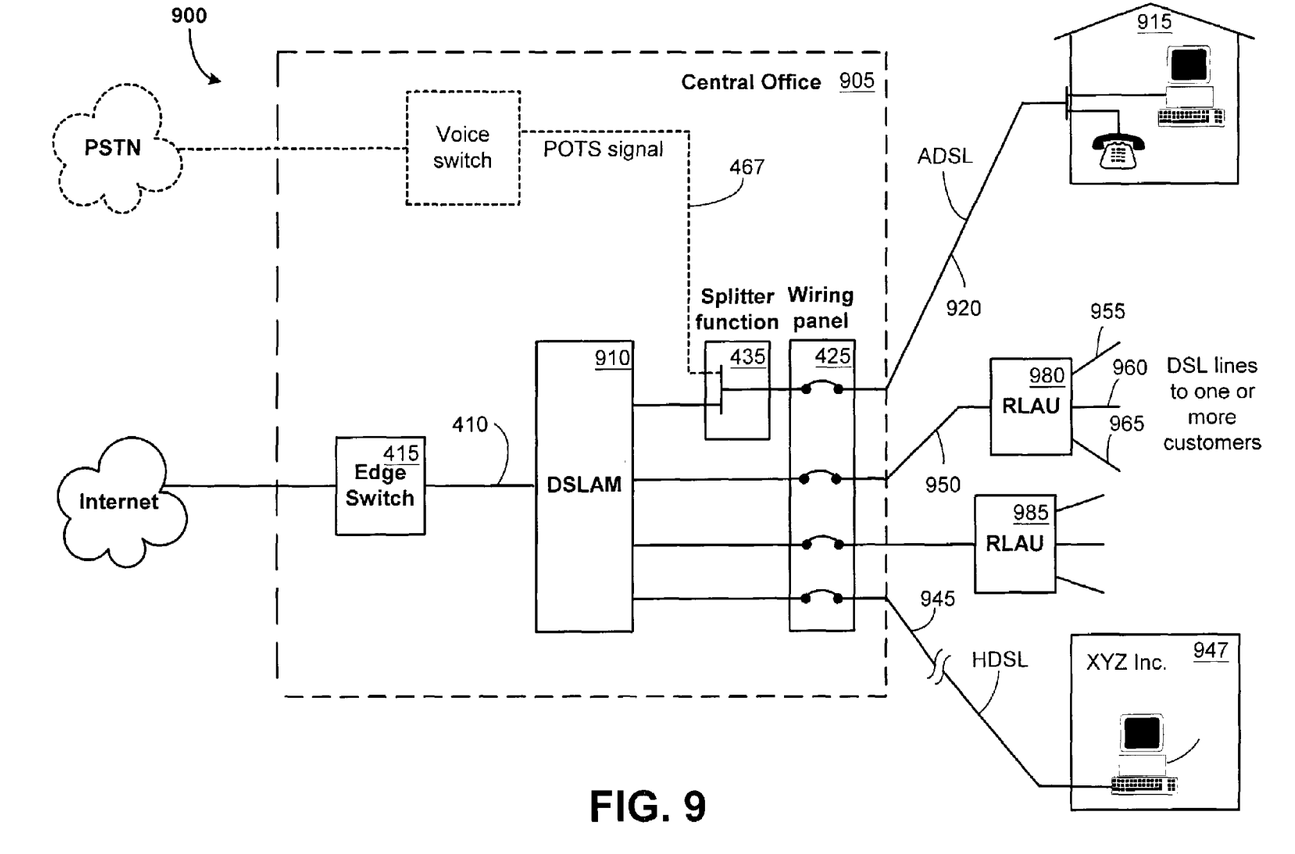
FIG. 9 illustrates a "hybrid" DSLAM located at a CO, and integrates traditional xDSL service with xDSL service using RLAUs.

FIG. 9 illustrates a "hybrid" DSLAM architecture 900 that is an exemplar application incorporating RLAUs into an existing DLSAM serving DSL customers from a CO 905. DSLAM 910 provides ADSL service to residence 915 via POTS link 920 using a traditional ADSL line card inside DSLAM 910. HDSL service is provided in a traditional architecture using a HDSL line card installed in DSLAM 910, to business 947 via HDSL link 945.

RLAU 980 is connected to CO 905 through a high-speed digital link 950 that is associated with DSLAM 910. RLAU 980 provides xDSL service to multiple customers located in an extended CSA. xDSL service is provided to these customers via links 955, 960 and 965 that are shown as example links. A second RLAU 985 is also shown connected to DSLAM 910. RLAU 985 may provide xDSL service to a second set of customers located in a second extended CSA.

It should be emphasized that the above-described embodiments of the present invention are merely possible examples of implementations and merely set forth for a clear understanding of the principles of the invention. Many variations and modifications may be made to the above-described embodiment of the invention without departing substantially from the spirit and principles of the invention.

For example, it will be appreciated by persons of ordinary skill in the art that the partitioning of circuit functions between the DSLAM-xDSL line card in the DSLAM, and the complementary RLAU-xDSL line card in the RLAU, may be carried out in many different ways. This circuit partitioning is dependent on overall system design. For example, while in one case software at the RLAU may be completely eliminated, in a second case software related to some limited functions, such as failure-reporting, may be included. In a third case, the circuit functions of the RLAU line cards may be integrated into circuit packs containing traditional DSL line card circuits. In yet another case, software associated with an RLAU may be integrated into software for other equipment that may be installed in a remote location. All such modifications and variations are intended to be included herein within the scope of the present invention and protected by the following claims.

The invention claimed is:

1. A digital communication system comprising:
a remote line access unit (RLAU) providing signal format conversion between a digital subscriber line (DSL) signal and a high-speed digital signal, the RLAU further incorporating splitter functionality such that the DSL signal is received separately from an analog voice frequency (VF) signal, the DSL signal being received at the RLAU from a digital subscriber line access multiplexor (DSLAM) and the DSL signal being combined with the analog voice frequency (VF) signal by the RLAU, the analog voice frequency (VF) signal being received from a plain old telephone system (POTS); and
a digital subscriber line access multiplexer (DSLAM) processing the high-speed digital signal,
Wherein the RLAU receives Internet data via the high speed digital signal, receives communication data via a different signal, combines the received data, and converts the combined data into a plurality of different DSL signals in a plurality of different DSL formats.

2. The digital communication system of claim 1, wherein the RLAU located at a first location is communicatively coupled to the DSLAM located at a second location through a high-speed digital link.

3. The digital communication system of claim 1, wherein the RLAU communicatively couples at least one voice signal to a high-speed digital link carrying the high-speed digital signal.

4. The digital system of claim 1, wherein at least one voice signal is communicatively coupled by the RLAU to a communication trunk that is connected into a digital loop carrier system.

5. The digital system of claim 1, wherein at least one voice signal is communicatively coupled by the RLAU to a communication trunk that is connected into a private branch exchange voice switch located outside of a wire center.

6. The digital system of claim 1, wherein at least one voice signal is communicatively coupled by the RLAU to a communication trunk that is connected into a voice switch located at a central office (CO).

7. The digital system of claim 1, wherein at least one voice signal is communicatively coupled by the RLAU to a communication trunk that is connected into a GR-303N5.2 voice gateway.

8. A digital communication system comprising:
a remote line access unit (RLAU) line card comprising an analog front end (AFE), the RLAU line card providing line driver functionality, the RLAU line card coupled to a digital subscriber line access multiplexor (DSLAM) interface block providing signal format conversion between a digital subscriber line (DSL) signal and a high-speed digital signal, the RLAU line card located at a first location, the remote line access unit (RLAU) further providing splitter functionality to combine a received DSL received from the DSLAM and an analog voice frequency (VF) signal, received from a plain old telephone system (POTS); and
a second circuit comprising a digital signal processor (DSP), the second circuit located at a second location.

9. The digital communication system of claim 8, wherein the first location is a cabinet located at a remote distance from a telephone central office (CO), and the second location is the CO.

10. The digital communication system of claim 8, wherein the first location is a customer premise, and the second location is a CO.

11. The digital communication system of claim 8, wherein the first location is a customer premise, and the second location is a cabinet located at a remote distance from a CO.

12. A digital communication system comprising:
a digital subscriber line access multiplexer (DSLAM) that is communicatively coupled on its line-side to a high-speed digital link; and
a first remote line access unit (RLAU) that is communicatively coupled on its trunk-side to the DSLAM through the high-speed digital link, and is communicatively coupled on its line-side to a first digital subscriber line (DSL), the RLAU further incorporating splitter functionality such that DSL signals are received from the DSLAM and combined with analog voice frequency (VF) signals, by the first RLAU, the analog voice frequency (VF) signals being received from a plain old telephone system (POTS).

13. The system of claim 12, wherein the first RLAU comprises a first line-card communicatively coupled to the first digital subscriber line (DSL).

14. The system of claim 12, wherein the first line-card communicates with a first DSL modem that is located at a distal end of the first digital subscriber line.

15. The system of claim 14, wherein the high-speed digital link comprises a fiber-optic link.

16. The system of claim 14, wherein the high-speed digital link comprises an electrical conductor.

17. The system of claim 14, wherein the high-speed digital link comprises a wireless link.

18. The system of claim 12, further comprising a second RLAU that communicatively coupled to the high-speed digital link.

19. The system of claim 18, wherein the second RLAU comprises a second line-card communicatively coupled to a second digital subscriber link.

20. The system of claim 19, wherein the second line-card communicating with a second DSL modem that is located at a distal end of the second digital subscriber line.

21. The system of claim 20, wherein the high-speed digital link comprises a fiber-optic link.

22. The system of claim 20, wherein the high-speed digital link comprises at least one of the following an electrical conductor and a wireless link.

* * * * *